Sept. 7, 1965   KARL-WERNER KANNGIESSER   3,205,423
ARRANGEMENT FOR REGULATION OF CURRENT FLOW FOR PARALLEL
CONNECTED SEMI-CONDUCTOR RECTIFIERS
Filed April 11, 1961   4 Sheets-Sheet 1
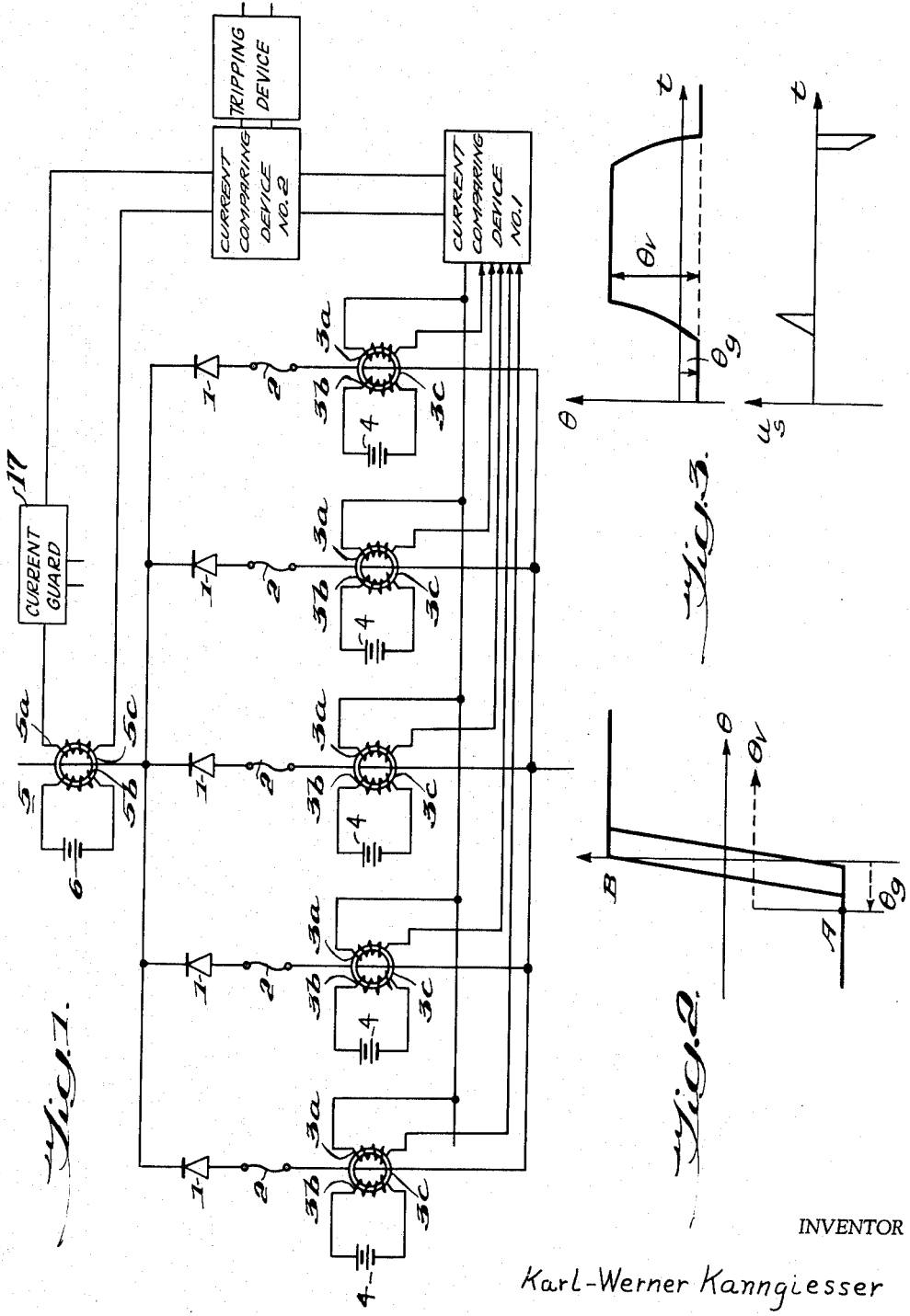
INVENTOR
Karl-Werner Kanngiesser
BY Pierce, Scheffler & Parker
ATTORNEYS INVENTOR
Karl-Werner Kanngiesser
BY Pierce, Schiffler & Parker
ATTORNEYS

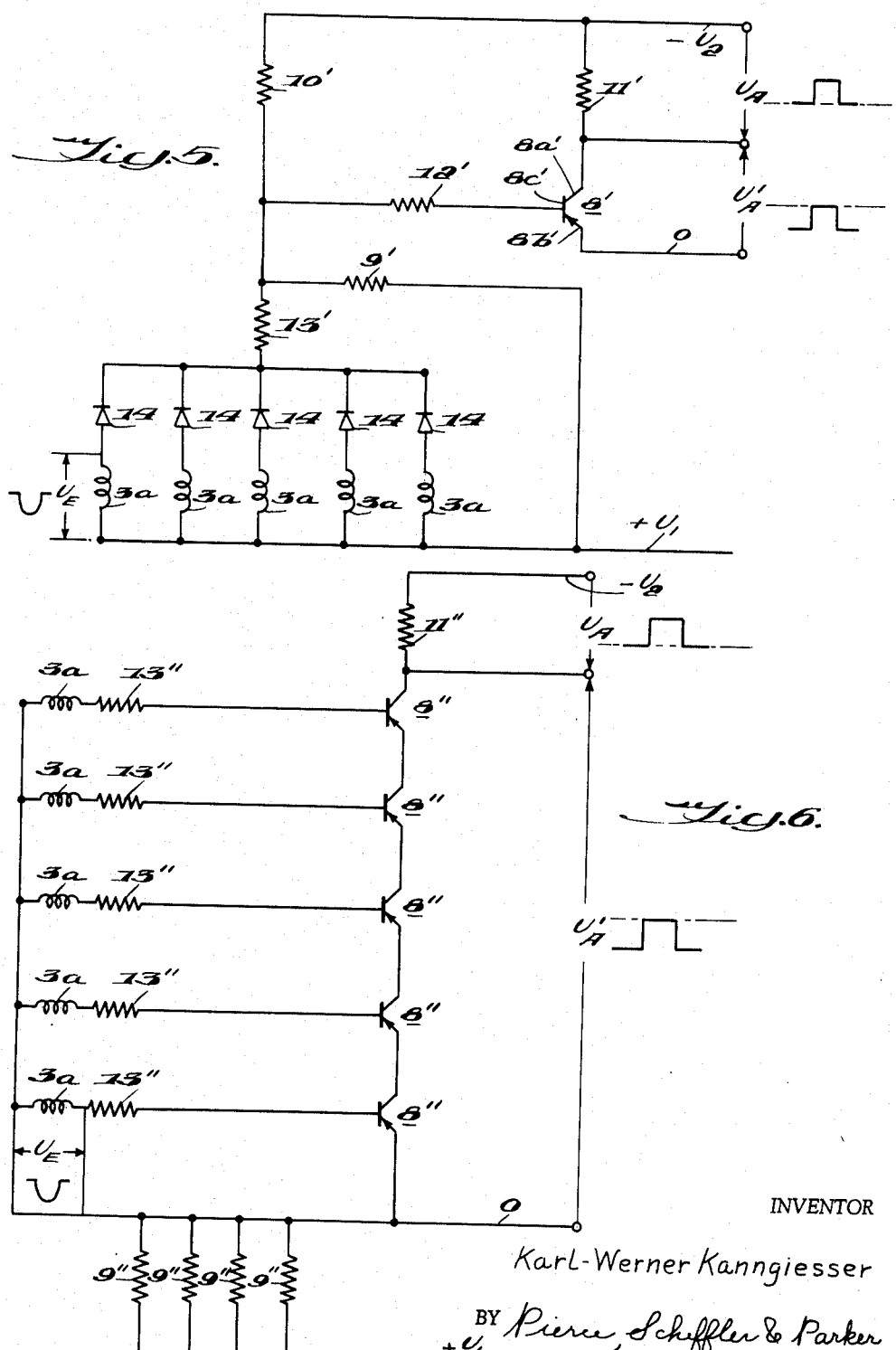

United States Patent Office 3,205,423
Patented Sept. 7, 1965

3,205,423
ARRANGEMENT FOR REGULATION OF CURRENT FLOW FOR PARALLEL CONNECTED SEMI-CONDUCTOR RECTIFIERS
Karl-Werner Kanngiesser, Mannheim, Germany, assignor, by mesne assignments, to Aktiengesellschaft Brown, Boveri & Cie, Baden, Switzerland, a joint-stock company of Switzerland
Filed Apr. 11, 1961, Ser. No. 102,193
Claims priority, application Germany, Apr. 14, 1960, B 57,486
9 Claims. (Cl. 321—11)

This invention relates to rectifier systems and more particularly to rectifier systems employing a plurality of rectifier valves of the semiconductor type such as germanium or silicon diodes connected in parallel.

The general purpose of the invention is to provide an improved arrangement for supervising the flow of current in the individual valves so as to enable one to ascertain when there is a failure in any of the parallel connected valves.

Rectifier systems with semiconductor valves, for example, germanium or silicon diodes, which are intended for transformation of high current intensities, require that each rectifier phase or valve route be equipped with a plurality of parallel connected semiconductor valves. The number of these rectifier phases corresponds with the pulse number of the rectifier, so that for example, a six-pulse rectifier has six groups of parallel connected semiconductor valves.

Since the individual semiconductor valves are arranged for the partial currents coming to them, the undisturbed continuous operation of the rectifiers at norminal direct current requires a satisfactory parallel working of the semiconductor valves. In order to supervise this it is necessary to undertake a continuous examination of whether all semiconductor valves are involved in the current flow and are intact with respect to their rectifying effect.

Ordinarily a fuse is connected in series with each of the parallel working semiconductor valves which upon a disturbance of any particular valve, for example, upon a loss of blocking ability, burns through. The burning out of a fuse, however, can easily go unnoticed. In addition, the remaining intactness of all fuses is still no guarantee that all parallel connected semiconductor valves are equally involved in the current carrying. For example, one or several of the valves, because of poor contact, can conduct less or even no current at all, without burning out a fuse.

The supervision of the current flow through the individual semiconductor valves in the forward direction therefore requires a measurement of the individual valve currents. These valve currents run, as known, in impulse form and have a direct current component, since they flow in only one direction. They can therefore be transmitted by means of a transformer, and the use of a transformer makes possible a galvanic separation of the measuring circuit from the rectifier currents, but it is necessary in the measurement-technology evaluation to take into account this direct current component. Various methods are familiar for this. One of these familiar measuring methods for the transmission of impulse currents with a direct current component is the use of a continuous direct current pre-magnetizing by means of a third winding on the transformer with an auxiliary direct current flowing through it, whereby is achieved a continuous traversal of the entire magnetization loop.

The supervision of the current flow in the individual semiconductor valves requires the use of one transformer in each of the individual valve circuits and an additional common transformer, hereinafter referred to as a sum transformer, which carries the combined or sum current of the parallel connected semiconductor valves.

In accordance with the invention, for the supervision of the current flow in the forward direction through the parallel connected semiconductor valves which together constitute, for example, one phase of a rectifier system for rectifying a polyphase alternating current, an arrangement is used which includes branch transformers such as current transformers individual to and connected in series with each of the parallel connected semiconductor valves, and another sum current transformer connected in the circuit which is common to all of the paralleled semiconductor valves and through which passes the sum of the currents passed through the individual semiconductor valves. The respective outputs from the secondaries of all the branch transformers are fed as inputs to a first current-comparing device which functions to continuously compare the branch currents flowing in the individual semiconductor valve circuits and to produce an output signal only when all of the branch valve circuits are operating properly, i.e. in their normal current carrying condition. This output signal has a polarity which is the inverse of the input impulses from the branch transformer secondaries. The output signal in the form of voltage impulses together with the voltage impulse outputs from the secondary of the sum current transformer serve as the two inputs to a second current comparing device similar to the first one. These two input voltage impulses, when there is a normal condition of coincidence of current flow in all the semiconductor valve branches have such a phase or time relationship that at no moment do both such input voltage impulses exist simultaneously, so that from the second current comparing device no output signal will be produced; however, in the event there should arise some abnormality in any of the semiconductor valve circuits which thus leads to a condition of non-coincidence as regards the currents flowing in the valve circuits, both of the input voltage impulses go in at the same time and thereby produce an output signal which can then be used to energize an alarm circuit or cut off the current flow to the valves, or for such other supervisory purpose as may be desired.

In the accompanying drawings to be considered in conjunction with the description of my invention:

FIG. 1 is an electrical schematic diagram illustrating one embodiment of the supervisory system in accordance with the invention;

FIG. 2 is a diagram showing the characteristic of the magnetization loop of the core material used for the transformers employed in the circuit of FIG. 1;

FIG. 3 shows the development of the secondary voltages of the transformers;

FIG. 5 is a diagram similar to FIG. 4 showing a second embodiment for the current-comparing device;

FIG. 6 is also a diagram similar to FIG. 4 showing a third embodiment for the current-comparing device.

Figure 4:
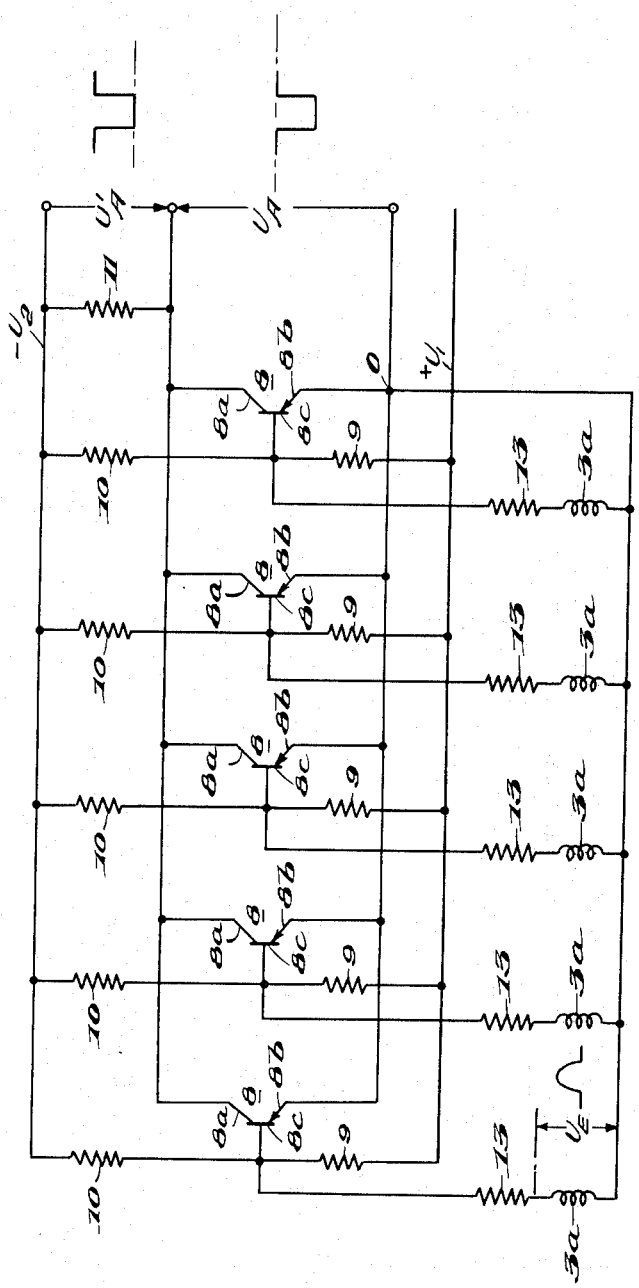
FIG. 4 is an electrical schematic diagram illustrating one embodiment for a current-comparing device used in the circuit of FIG. 1.

With reference now to FIG. 1, which shows but one phase of the rectifier system, it will be seen that it includes a plurality, e.g. five parallel connected semi-conductor valves 1 which may be germanium or silicon diodes, or the like. Each of the five paralleled rectifier branches includes one of the semiconductor valves 1, a fuse 2 and a transformer illustrated as an iron core type current transformer 3. The valve 1, fuse 2 and primary of transformer 3 are all connected in series. Each of the transformers includes a secondary winding 3a on the core 3c and a pre-magnetizing winding 3b also on the core and connected to a suitable source of direct current 4.

For the purpose of measuring the sum of the currents passed through the rectifier valves 1 in the forward direction, i.e. the total current for this particular phase of the alternating current being rectified, there is provided another iron core current transformer 5 which includes a secondary winding 5a and a pre-magnetizing winding 5b also on the core 5c and connected to a suitable source of direct current 6. The voltage produced by secondary winding 5a is a measure of the sum current flowing through all five paralleled rectifier paths.

All of the secondary windings 3a of transformers 3 are connected as inputs to a first current-comparing device #1 which serves the purpose of supervising the normal coincidence of the currents passed by the five semiconductor valves 1 when the latter are all operating in a normal manner. The current-comparing device #1 which is provided, for example, with switch transistors arranged in an on-or-off manner in accordance with one of the three alternative circuit arrangements shown respectively in FIGS. 4, 5 and 6, operates in such manner that when there is coincidence between the five secondary impulse voltages produced at the transformer secondaries 3a which form the input signals to the current-comparing device #1, there arises an output signal in pulse form inverse to the input signals. However, in the event of a non-coincidence as between the five secondary voltages, which will occur, for example, as a result of a breakdown in current flow through one or more of the semiconductor valves 1, no output signal will be produced.

A second current-comparing device #2 is provided and which is of the same basic internal construction as the first current-comparing device #1. The output voltage in pulse form which is the output signal of current-comparing device #1 constitutes one input to current-comparing device #2 and the other input thereto is constituted by the secondary voltage of the sum transformer 5 also in pulse form. In the current-comparing device #2 the two input voltage impulses, with coincidence of current flow through the semiconductor valves 1, operate in conjunction with each other so that no output signal arises; but when there is a lack of coincidence in the currents flowing through the valves 1, an output signal in the form of pulses is produced.

The magnetic relationships of the current transformer are shown in FIG. 2. A core magnetization loop having a substantially rectangular configuration is made the basis of transformer operation, and it is further assumed, of course, that the core of each current transformer is provided with the direct current pre-magnetization component previously referred to. In FIG. 2, B indicates the magnetic induction in the transformer core, and the magnetic flux through the windings is designated by $\theta$. The flux $\theta$ is composed of the flux component $\theta_v$ of the individual valve currents in the case of the branch transformers 3, or of the total valve current of the rectifier phase in the case of transformer 5, and of the flux component $\theta_g$ produced by the auxiliary direct current pre-magnetization winding 3b or 5b. With an absence of valve current produced flux $\theta_v$, the working point A of the magnetization loop is established. Upon a flow of valve current, the entire magnetization loop is permeated, as indicated by the broken line arrow.

The direct current pre-magnetization is not an indispensable condition. With the use of transformers having cores made with normal dynamo sheeting, sometimes with an air gap, pre-magnetizing is unnecessary under some circumstances, but then there results a lessening in the response sensitivity of the supervisory circuit.

The current and voltage courses of the current transformers are shown in FIG. 3. There the upper oscillogram shows the valve current given, for example, with a six-pulse rectifier with 120° current flow duration plus the commutation duration, where the zero line of the current is lowered by the flux component $\theta_g$ and the flux component $\theta_v$ starts from this zero line. The secondary voltage impulse $U_s$ produced by this flux are shown in the lower oscillogram. Here, there is assumed such a high resistance in the input of the current-comparing device #1 that the transformer represents no current image, but works differentiatingly. In this way it is assured that the supervising arrangement works not only at nominal current of the unit but also at small partial loads.

The current-comparing device #1, as already mentioned, is expediently constructed with switch transistors. Various arrangements of transistors are possible, depending upon whether the transistors assigned to the individual semi-conductor valves are connected in parallel or in series. It depends on this and upon the decline of the output signal whether for the production of the output signal impulses inverse to the input signal impulse another connection or the use of a return stage is necessary or not. The circuit connections of the parallel arranged transistors can be simplified and it is even possible to operate with but a single transistor provided that the connection with the individual current transformers take place across semiconductor valves for the uncoupling of the individual current branches.

FIG. 4 illustrates one embodiment for the current-comprising device #1 and which employs parallel arranged switch transistors. In this view are shown five transistors 8 of the p-n-p type and connected in an emitter-base arrangement. All of the collectors 8a are connected together in parallel and all of the emitters 8b are also connected together in parallel. Each of the bases 8c is connected through an individual resistance 10 with a fixed negative voltage $-U_2$, and each of the bases 8c is connected through an individual resistance 9 with a fixed positive voltage $+U_1$. These resistances represent the necessary biasing of the base as related to the emitter which lies at the voltage 0, through which the transistor is rendered current-carrying when an input signal is lacking. The base 8c of each transistor 8 is connected through an individual resistance 13 to the appertaining secondary winding 3a of the individual current transformer 3. The transistors 8 work across the collector 8a lead-ins on the common operating resistance 11, and the output voltage $U_A$ appears between the lower end of this resistance, i.e. the end connected to the collector electrodes 8a, and the voltage 0.

If a semiconductor valve 1 is current-carrying, then on the base of the appertaining transistor 8 there lies an input voltage $U_E$, designated in FIG. 3 by $U_S$, and which consists of a series of positive and negative impulses. Of these implses, however, only the positive ones are effective since the transistors in the case of a negative impulse is current-carrying as usual. Correspondingly, in FIG. 4, only the positive impulses $U_E$ have been indicated symbolically as input impulses to the transistors 8.

Through each of these positive impulses, the appertaining transistors become blocked and hence, rendered currentless.

If all of the semiconductor valves 1 are in a normal current carrying state, then all of the transistors 8 become blocked by the appertaining positive input impulses $U_E$ and thus the operating resistance 11 becomes currentless also. Consequently, there arises an output signal $U_A$ consisting of negative impulses, which is likewise illustrated symbolically in FIG. 4.

From this output signal is to be formed the output signal inverse to $U_A$ for achieving the desired working together with the secondary voltage of the sum transformer 5. This can take place by means of a further return stage, familiar in itself, and hence, not shown in FIG. 4. But also in place of the output signal $U_A$ measured against the voltage 0, the output signal $U'_A$, already inverse, measured against the voltage $-U_2$ can be taken off.

In lieu of the circuit diagram according to FIG. 4 with a plurality of parallel connected transistors, a simpler circuit arrangement using only one transistor as shown in FIG. 5 can be used. With this embodiment, the input signals are fed to a common transistor 8' across five semiconductor valves 14 serving for the uncoupling.

With the arrangement of FIG. 5, the input signal voltages $U_E$ must be fed in as negative impulses, as is indicated symbolically. In the event of an absence of input impulses, the semiconductor valves 14 carry a direct current across the resistances 13' and 10' whereby the base 8c' of transistor 8' becomes positive, and hence, blocks this transistor. Meanwhile, if with normal current flow in all of the parallel connected semiconductor valves 1 in FIG. 1, all input impulses are present, then during the impulse duration, the semiconductor valves 14 become blocked and are currentless, whereupon the base 8c' of transistor 8' receives across resistances 10' and 12' a negative voltage and the transistor 8' becomes current-carrying. Thereupon, there arises on the output resistance 11' the output voltage $U_A$ measured against the voltage source $-U_2$, in the form of positive impulses as indicated symbolically in FIG. 5. Across the collector 8a' and emitter 8b' of transistor 8' there arises the output voltage $U'_A$ which is inverse to voltage $U_A$. The output signal formed by the voltage $U'_A$ thus has, apart from its negative sign, the form which is necessary for cooperation with the secondary voltage of the sum transformer 5, and thus can be utilized further.

Still another embodiment for the current-comparing device #1 is illustrated in FIG. 6 where it will be seen that five transistors 8'' are connected in series. Each of these transistors becomes blocked when no input signal arises from the related valve branch. The input voltages $U_E$ from the transformer secondaries 3a are led in as negative impulses as measured against the voltage 0. Upon an appearance of any input signal derived from a secondary 3a, the appertaining transistor 8'' becomes conductive.

If all the semiconductor valves 1 in FIG. 1 are in a current-carrying state, so that all input signals in FIG. 6 are presents, then all transistors 8'' become conductive and thus current-carrying for the duration of the negative impulses $U_E$. Thus, there appears on the output resistance 11'' a positive output signal impulse $U_A$ measured against the voltage $-U_2$, while across the transistors 8'' connected in series, the output signal impulse $U'_A$ inverse to signal $U_A$ can be taken off. This corresponds again, apart from its negative sign, to that output voltage which can be utilized in cooperation with the secondary voltage from the sum current transformer 5.

It is a characteristic of all circuit arrangements which have been given as examples, for the current-comparing device #1, that an output signal can be taken from it which for the duration of the impulse is the voltage 0 and which is a positive voltage outside of the pulse duration. In this the input impulse effective for the response of the current-comparing device #1 is positive or negative depending upon the circuit arrangement selected. Meanwhile, since the secondary windings 3a of the individual current transformers 3 and of the sum transformer 5, as is made in clear in FIG. 3, continually give off positive and negative impulses, there are available to the current-comparing device #1 in any case, input signals of suitable polarity. Thus, also the method of connecting the secondary windings to the current-comparing device #1 is immaterial insofar as the method of connection of the current-comparing device #2 to the sum transformer 5 is suited to that of the current-comparing device #1; this is discussed more in detail in a later part of the specification.

The output voltage impulses of the current-comparing device #1 form together with the voltage impulses from the secondary 5a of the sum transformer 5 the two input signal impulses to the current-comparing device #2, as indicated in FIG. 1. Current-comparing device #2 has in principle the same circuit construction as current-comparing device #1, for example, that illustrated in FIG. 4, but modified so as to accommodate only two input signals. Thus, there will be only two transistors 8 required.

Figure 7:
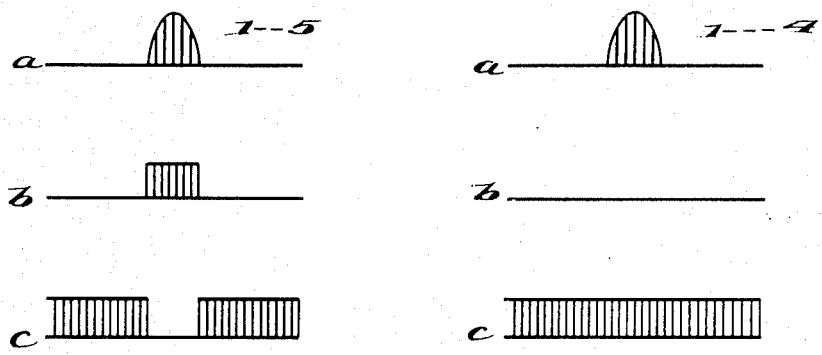
FIGS. 7 and 8 are diagrammatic views illustrating certain input and output voltage signals related to the current comparing devices.
Figure 8:
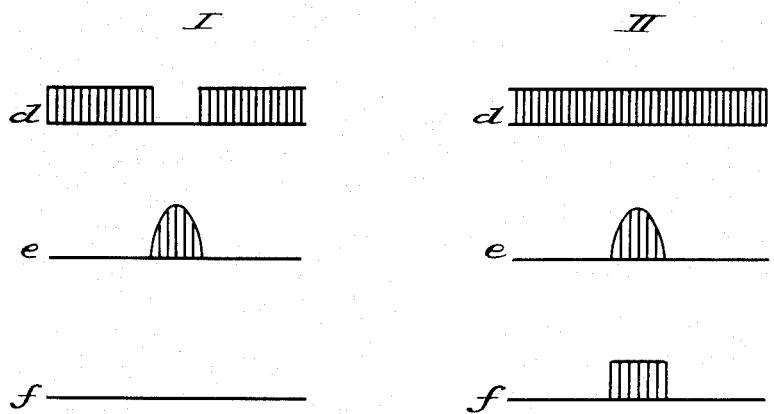

In order to be able to understand more easily the operation of this current-comparing device #2, in combination with the function of current-comparing device #1, the signal impulses arising on coincidence or non-coincidence of the current flow through the semiconductor valves 1 are compared in FIGS. 7 and 8. FIG. 7 shows the input and output signal impulses of the current-comparing device #1, while in FIG. 8 the input and output signal impulses for the current-comparing device #2 are represented. Both FIGS. 7 and 8 show in the left column grouped under heading I the signal impulses which appear on coincidence of the curent flows through the five semiconductor valves 1 of the FIG. 1 circuit. Grouped under heading II in the right column of both FIGS. 7 and 8 are shown the signal impulses established for a non-coincidence of current flows through the five semiconductor valves 1.

In the former case, thus on coincidence of current flows through all five parallel connected valves 1, there appear the five impulses shown in FIG. 7 under Ia and designated by 1 - - - 5,'s coming from the individual transformers 3, as input impulses to the current-comparing device #1. They are designated positive. The equidirectional output signal impulse of the current-comparing device #1 is shown in Ib. The output signal impulse inverse to it is shown in Ic. This forms, as FIG. 8 makes clear under Id, the one input signal impulse to the current-comparing device #2, while as a second input signal impulse to the current-comparing device #2 is used the signal impulse represented in Ie given by the sum transformer 5. Both signal impulses which at no moment of time exist simultaneously thus exclude each other mutually, so that the current-comparing device #2 establishes a non-coincidence of the two input signal impulses. Consequently, in the current-comparing device #2, as the representation If shows, no output signal impulse arises. In this, to be sure, it is necessary to take care that the manner of connection of the secondary winding of the sum transformer 5 is so chosen that the time duration of voltage zero of the output signal impulse from the current-comparing device #1 coincides with the time of the arrival of the impulse from the sum transformer.

In the case of currentlessness of the current rectifier there arises, just as with a lack of coincidence in the current-comparing device #1, the output signal impulse shown in IIc in FIG. 7. But since in this case the sum transformer 5 carries no current, the signal IIe in FIG. 8 falls out, so that the current-comparing device #2 delivers no output signal impulse.

In the second case, thus with non-coincidence of the current flows through the parallel connected semiconductor valves 1, there again appear similar impulses to those shown in FIG. 7 in Ia as input signals to the current-comparing device #1, but their number is lessened, for example by one, which is indicated in IIa by 1 - - - 4. Consequently, the equidirectional output signal of the current-comparing device #1 falls out, which gives the representation IIb. The signal inverse to it is represented in IIc as a constant voltage. This forms again the one input signal, repeated in FIG. 8 at IId, of the current-comparing device #2, while the second input signal, given off by the sum transformer 5, to the current-comparing device #2, which is seen in IIe has remained unchanged as related to the signal Ie. Thus, there exists for the current-comparing device #2 for the impulse duration a coincidence of the input signals, so that the output impulse indicated at IIf is given off. The voltage corresponding to this can be further utilized for the indication of disturbances of the semiconductor valves 1. Alternatively, a tripping device 16 as shown schematically in FIG. 1 may be connected to the output of current-comparing device No. 2 for switching off the rectifier system.

The satisfactory functioning of the supervisory system assumes that the magnetization loop of the individual current transformers 3 and of the sum transformer 5 is entirely permeated on each current impulse, or at least to an essential part. Since this is the case only with a definite minimum direct current of the semiconductor current rectifier, in rectifier systems which operate with current changes even down to a zero value, the supervisory device must be switched off below this minimum current intensity. Therefore, in accordance with a further feature of the invention, there is provided a current guard 17 illustrated schematically in FIG. 1 which is attached to the sum transformer, this guard serving to switch off the supervisory device below the minimum current intensity mentioned, for example, by interruption of its operating direct voltages or by disconnection of the output lead from the second current-comparing device (#2).

In many cases, it is not completely satisfactory to merely indicate that inside of one rectifier phase the current flow through one or more semiconductor valves has been interrupted. In such cases it is also desired to designate which of the semiconductor valves has faulted. In order to make this possible, the coincidence as between each individual valve current and the sum current can be supervised. This can be achieved in accordance with the embodiment of FIG. 1 by arranging five of the current-comparing devices #2 connected with the output from the secondary of the sum transformer 5, and omitting the current-comparing device #1.

Such an individual supervision of the semiconductor valves 1, however, is possible with less expense if one uses incandescent lamps connected respectively to the secondary windings of the current transformers 3. The lighting up of these lamps thus provides a visual indication of the current flow in the semiconductive valves. It is also possible to utilize neon lamps in lieu of incandescent lamps but then under some circumstances, special auxiliary windings must be placed on the cores of the current transformers 3 in order to provide the much higher voltages required for operating the neon lamps.

With large rectifier installations it will be usually sufficiently important to continue with the rectifying operation even in the phase in which one or more semiconductive valves may have faulted until a stoppage can be undertaken without operational disadvantages. In such a case, to be sure, precautions must be taken that the remaining valves in the damaged rectifier phase do not become excessively overloaded. According to experience, this can be achieved in rectifier systems provided with automatic current regulation so that upon the giving off of a signal impulse from the current-comparing device #2, the normal load amplitude of the direct current for that rectifier unit or a group of units will be automatically reduced, e.g. by shifting with use of relays, so that operation can be continued without overloading the remaining semiconductor valves.

I claim:

1. In a supervised rectifier system for rectifying a polyphase alternating current the combination comprising a plurality of branch rectifier circuits for each phase to be rectified connected in parallel, a semiconductor rectifier valve connected in each such branch circuit, a current transformer in each such branch circuit and having the primary thereof in series with its corresponding semiconductor rectifier valve for monitoring current flow therethrough in the forward direction, a sum current transformer having its primary in series with a part of said rectifier system carrying the sum of all the forwardly flowing currents in said branch circuits, a first current-comprising device, circuit means connecting the voltage impulses obtained from the secondaries of said branch current transformers respectively as input signal impulses to said first current-comparing device, the character of the output signal from said first current-comparing device being dependent upon whether or not all of said input signal impulses are coincident, a second current-comparing device, and circuit means connecting the voltage impulses obtained from the secondary of said sum current transformer and the output from said first current-comparing device respectively as inputs to said second current-comparing device, the character of the output signal from said second current-comparing device being dependent upon whether or not all the current flows in said branch rectifier circuits are coincident.

2. A supervised rectifier system as defined in claim 1 wherein the output signal from said first current-comparing device is constituted by a series of voltage impulses having a polarity inverse to that of said input voltage impulses obtained from the secondaries of said branch circuit current transformers when said branch circuit rectifier currents register coincidence, said voltage impulses from said first current-comparing device and said voltage impulses obtained from the secondary of said sum current transformer which constitute the inputs to said second current-comparing device at no moment exist simultaneously when said branch circuit rectifier currents register coincidence but do exist simultaneously when said branch circuits rectifier currents are non-coincident, and an output signal from said second current-comparing device being produced only in the case of a non-coincidence of said branch circuit rectifier currents.

3. A supervised rectifier system as defined in claim 1 wherein said branch circuit current transformers and said sum current transformer have cores provided with premagnetizing windings thereon, and a source of direct current for energizing said windings.

4. A supervised rectifier system as defined in claim 1 wherein said first and second current-comparing devices are constituted by an arrangement of switch transistor means.

5. A supervised rectifier system as defined in claim 4 wherein for said first current-comparing device a switch transistor is provided for each branch rectifier circuit, said transistors being arranged with their emitters and bases connected respectively in parallel, and said voltage impulses from the secondaries of said branch circuit current transformers being applied respectively to the bases of said transistors, said transistors being blocked upon a condition of coincidence in said branch circuit currents, and producing an output signal.

6. A supervised rectifier system as defined in claim 4 wherein for said first current-comparing device, a switch transistor is provided and arranged in emitter-base connection, said input voltage impulses from said secondaries of said branch circuit current transformers are arranged in parallel circuits connected to said base, and each such parallel circuit includes a semiconductor valve serving for the uncoupling of said input voltage impulses.

7. A supervised rectifier system as defined in claim 4 wherein for said first or second current-comparing device switch transistors corresponding in number to said branch rectifier circuits are connected in series, said input voltage impulses from said secondaries of said branch circuit current transformers are applied respectively to the bases of said transistors and said transistors become conductive only upon a register of coincidence as between said branch circuit rectifier currents and give rise to the production of an output signal.

8. A supervised rectifier system as defined in claim 1 and which further includes a current guard attached to said sum current transformer and which controls the switching on or off of the supervisory portion thereof, said supervisory portion being switched on only above a minimum current intensity for the rectifier system.

9. A supervised rectifier system as defined in claim 1 and which includes means controlled by the output signal produced by said second current-comparing device upon a condition of non-coincidence of said branch rectifier circuit currents for switching off said rectifier system.

References Cited by the Examiner

UNITED STATES PATENTS

| | | | |
|---|---|---|---|
| 2,285,556 | 6/42 | Batten | 321—13 |
| 2,684,460 | 7/54 | Busemann | 321—36 |
| 2,969,495 | 1/61 | Mosch et al. | 321—14 |
| 3,119,057 | 1/64 | Wilson | 321—14 |

FOREIGN PATENTS 765,395   6/54   Germany.

LLOYD McCOLLUM, *Primary Examiner.*

SAMUEL BERNSTEIN, *Examiner.*